Dec. 11, 1956  J. MARTIN  2,773,473
BIRD NIBBLES
Filed Feb. 28, 1955

INVENTOR:— Jonathan Martin

BY- Victor D. Borst

ATTORNEY

United States Patent Office 2,773,473
Patented Dec. 11, 1956

2,773,473

BIRD NIBBLES

Jonathan Martin, Preston, England

Application February 28, 1955, Serial No. 491,140

1 Claim. (Cl. 119—18)

This invention relates to bird "nibbles," and also to holders therefor for use in all kinds of bird keeping, but particurarly for use in birdcages housing bird pets, such as budgerigars and other domestic bird pets normally kept within the home.

It is quite well known that the diet of all birds should include gritty material and a supply of such material in loose comminuted form is usually provided in an open-topped container to which the birds have access at all times. For pet cage birds, a piece of cuttlefish bone is also usually provided and not only are the birds apt to scatter the gritty material onto the floor of the cage and thereby foul or contaminate the same, but the cuttlefish bone is at times difficult to obtain and is expensive and to avoid this waste it is the present practice to make a plaster block known as a "nibble" incorporating plaster and such other ingredients as may be required.

Such a block or "nibble" is generally hung in a convenient position in a birdcage or other housing for birds by means of a wire or metal strip located in and attached to the "nibble" during the casting operation.

The "nibbles" in use prior to the present invention when presented to the birds soon become detached from the wire or metal strip and fall onto the cage bottom, thus becoming contaminated and useless, and the object of the present invention is to provide an improved construction of "nibble" and also a holder therefor, when required, which will substantially eliminate the disadvantages outlined above.

According to this invention, a bird "nibble" comprises a block of plaster of Paris or other similar and suitable mouldable material incorporating other ingredients as required, said block being provided with grooves or a dovetailed portion whereby it can be mounted between the wires of a cage or in a complementarily shaped holder adapted to be mounted on a cage or the like.

In one arrangement, the "nibble" is roughly semi-circular in cross section with a projecting dovetail at the back or grooves which fit on the wires of the cage so that the "nibble" is held directly on the wires.

When a holder is used it may conveniently be fashioned from sheet metal and comprises a back plate having its margined edge-portions bent over and inwardly inclined to form undercut grooves, the rear portion of the "nibble" being of a shape complementary to said grooves so that the "nibble" can be slid end-on, preferably downwards, into the grooves to be held in place throughout its length. Where the sides of the "nibble" are parallel, the holder will be made accordingly and the bottom edge portion of the back plate will be bent forward to form a supporting flange at the bottom of the groove and thereby prevent the "nibble" from falling out. Preferably, the back plate and bent over margined edge portions are downwardly tapered and the back portion of the "nibble" is correspondingly shaped so that the "nibble" when slid downwardly into the groove is supported throughout its length without the necessity of providing a supporting flange.

The back plate may be provided with tabs or ears fashioned integrally therewith by a stamping or pressing operation, which tabs can be bent rearwardly around the wires of a birdcage permanently to hold the holder in position on the cage.

The invention will be described further, by way of example, with reference to the accompanying drawings in which.

Figure 1:
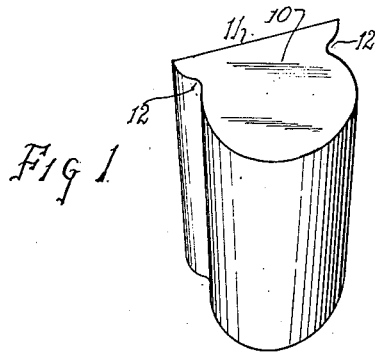
Fig. 1 is a perspective view of one form of "nibble" constructed in accordance with the invention.

Referring to Fig. 1, the "nibble" illustrated and generally designated by the reference numeral 10 comprises a tapered block moulded from a mixture of plaster of Paris, cement, dehydrated lime, oyster shell grit and other ingredients of a medicinal or palatable nature such as cod liver oil, wheat germ oil, iodine. As will be evident from the drawing, the "nibble" 10 is roughly semi-circular in cross-section, having one flat longitudinal face 11. The curved surface thereof is provided with two longitudinal grooves 12 extending from end to end of the block and which provide, effectively, a dovetail which extends the length of the block.

Figure 2:
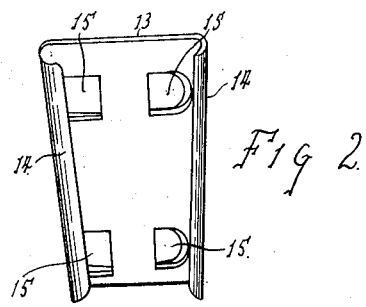
Fig. 2 is a perspective view of a holder for the "nibble" shown in Fig. 1.

Complementary to the "nibble" 10 is a sheet metal holder which is illustrated in Fig. 2. This comprises a tapered or trapezium-shaped metal plate 13 whose tapering edge portions or margins 14 are folded over so that the holder is C-shaped in cross-section.

Pressed out of the plate 13 are two pairs of tabs or ears 15, the tabs in each pair being oppositely directed to one another, and these serve for attaching the holder to a cage as will later be described.

Figure 3:
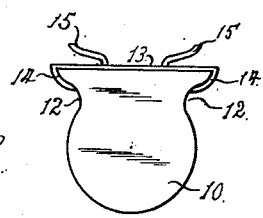
Fig. 3 is a plan view showing the "nibble" of Fig. 1 in position in the holder of Fig. 2.
Figure 4:
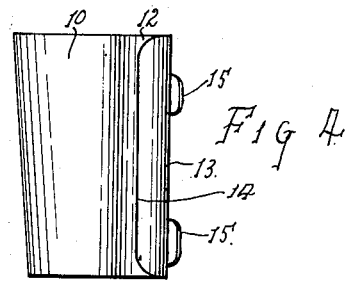
Fig. 4 is a side elevation corresponding to Fig. 3.

Referring now to Figs. 3 and 4, the "nibble" 10 is here shown in position in the holder, and it will be seen that the flat longitudinal face 11 of the block engages the plate 13 and the folded-over marginal portions 14 of the plate engage over the dovetailed portion of the block. Since the plate 13 and the "nibble" 10 are tapered, the "nibble" fits snugly in the holder and does not have to be held therein.

Figure 5:
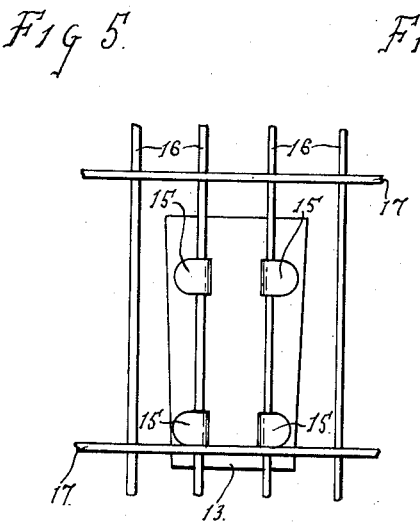
Fig. 5 is a view showing the holder secured to the wires of a birdcage.

Fig. 5 shows how the "nibble" and its holder can be secured to a wire birdcage or the like. The cage, of which only a part is illustrated comprises vertical wires 16 forming with horizontal wires 17, a mesh wall of the cage. The holder is permanently secured to the vertical wires 16 by folding over the tabs 15, and is supported vertically by resting upon one of the horizontal wires 17, the narrow end thereof being lowermost so that the "nibble" 10 cannot fall out of the holder when it is in position. After the holder has been secured in position to the cage as illustrated, the "nibble" is attached to the holder by presenting the lower or narrow end of the "nibble" to the upper or wider end of the holder, and sliding it downwards so that the dovetailed portion engages under the marginal portions 14 of the holder.

As the "nibble" engages the holder throughout the whole of its length, it will be appreciated that the "nibble" will remain in an integral condition until almost completely exhausted and will remain securely attached to the cage wires until such time as it begins to disintegrate.

Replacement can be effected quickly and easily when necessary.

Modifications can, if desired, be made to the holder. Thus, if it is required to secure it in a horizontal position instead of vertically as illustrated, still using the vertical wires the tabs 15 will be arranged at 90° to those illustrated.

Figure 6:
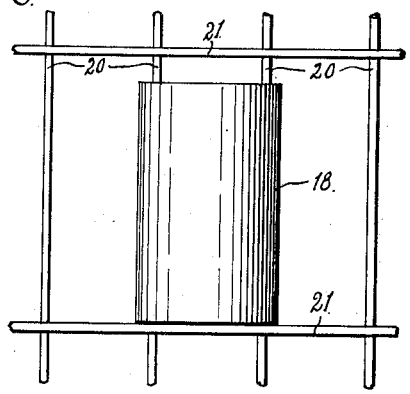
Fig. 6 is a front view of another form of "nibble" showing it secured to the wires of a birdcage without the need of a holder.
Figure 7:
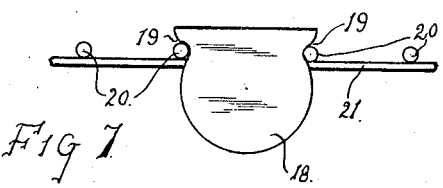
Fig. 7 is a plan view corresponding to Fig. 6, some of the wires of the birdcage being shown in section.

Figs. 6 and 7 of the drawings illustrate a form of "nibble" which can be secured to a cage wall without the use of a holder. In the embodiment shown the "nibble" 18 has a similar cross-section to the "nibble" 10 already described. However, instead of being tapered the "nibble" 18 is of constant cross-section throughout its length and the grooves 19 (which are equivalent to the grooves 12 of the previous embodiment) are parallel to one another. This "nibble" is shown in position secured to a cage wall form by a mesh of vertical wires 20 and horizontal wires 21, with two adjacent vertical wires 20 engaging in the grooves 19, this being effected by springing the two wires 20 apart temporarily whilst the "nibble" is being inserted therebetween.

If required, a holder may be provided for the "nibble" of Fig. 6, and this will be similar to that shown in Fig. 2 with the exception that the two folded over marginal portions 14 will be parallel to one another, and a lip or flange will be provided at the lower edge of the plate 15 so that the "nibble" will be supported thereby.

Although the examples above described relate to "nibble" holders and "nibbles" for use in wire mesh bird cages, it is obvious that they could be adapted for location in a convenient position in a hen-cote or even in an open chicken-run and at all times the "nibble" of disintegration of the block or detachment of same from the holder until it is practically exhausted.

I claim:

A bird nibble comprising a tapered block of palatable ingredients and having tapered side surfaces and a front and rear face, longitudinal grooves being provided in the side surfaces of said block and forming a dovetail thereon, and a tapered holder complementary to said block, said holder comprising a flat plate having upstanding and turned-in marginal portions extending its entire length and adapted to engage into the grooves in said block, the grooves in said block extending from one end of the block to the other end and disposed substantially nearer the rear face than the front face thereof.

References Cited in the file of this patent

UNITED STATES PATENTS

| | | |
|---|---|---|
| 270,071 | Ireland | Jan. 2, 1883 |
| 342,885 | Thompson et al. | June 1, 1886 |
| 485,328 | Lee | Nov. 1, 1892 |
| 2,112,940 | Voss | Apr. 5, 1938 |
| 2,678,022 | Jourgensen | May 11, 1954 |